June 20, 1939.	W. A. HART	2,162,813
VERTICAL BROACH
Filed Feb. 15, 1936	4 Sheets-Sheet 3

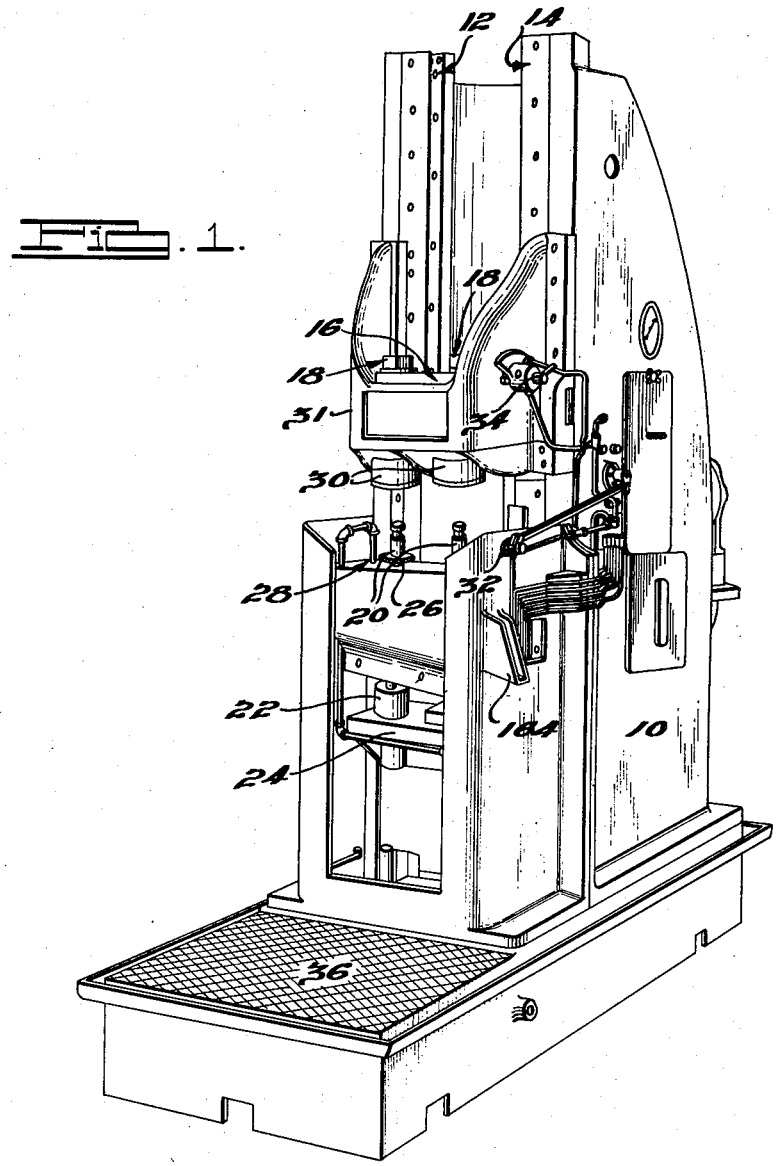

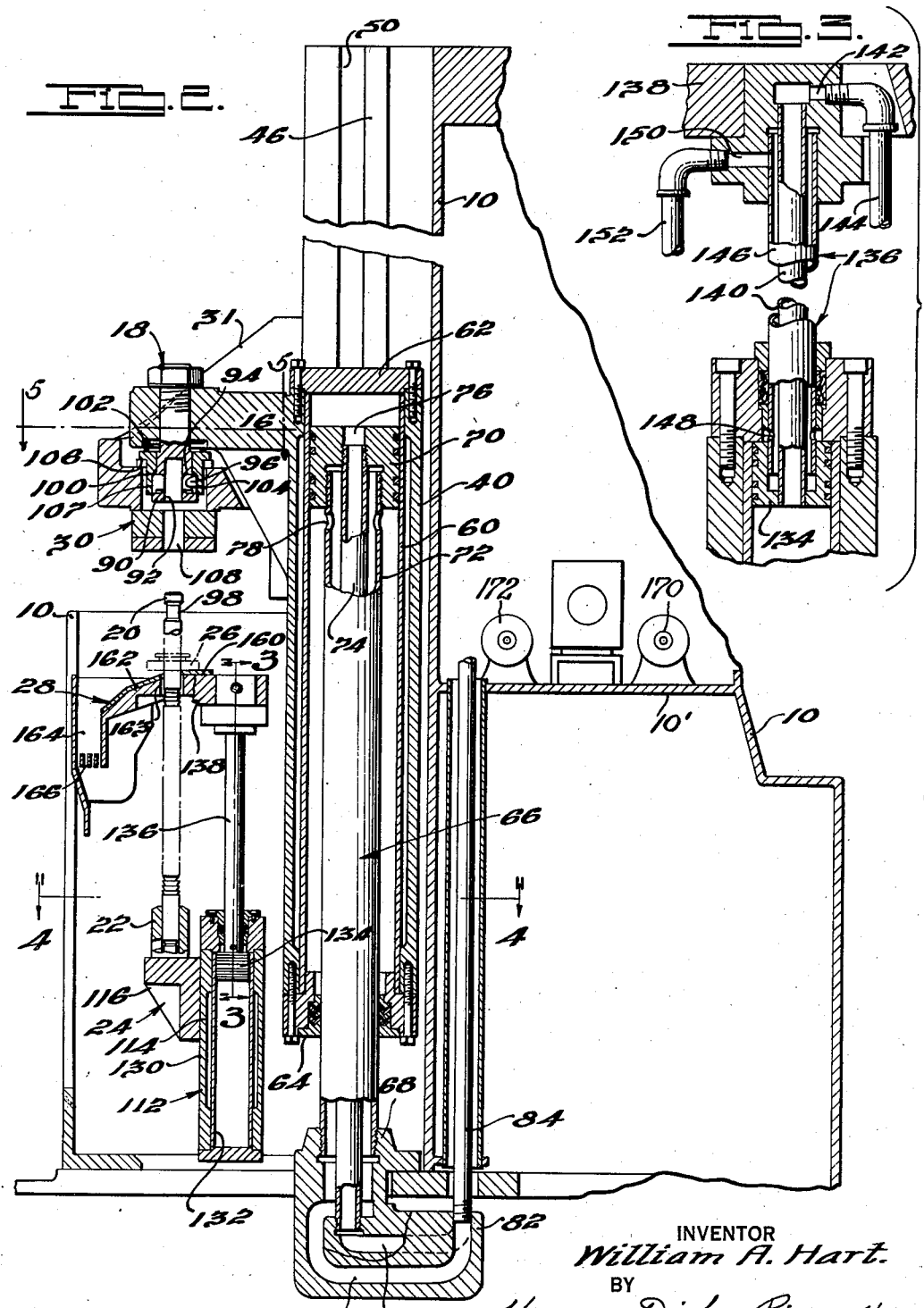

INVENTOR
William A. Hart.
BY
Harness, Dickey Pierce & Hann
ATTORNEYS.

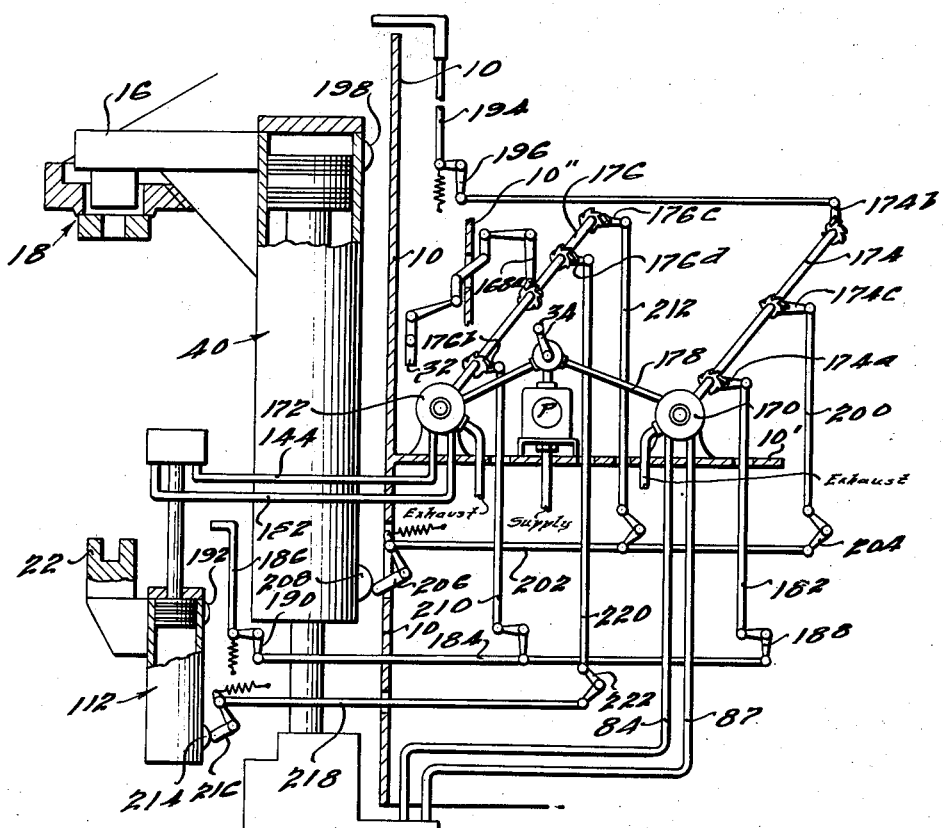

FIG. 6.

| Lever | 174a | On up stroke – operated by cylinder 112 at end of up stroke |
|---|---|---|
| " | 174b | Reverse – operated by cylinder 40 at end of up stroke |
| " | 174c | Off – operated by cylinder 40 at end of down stroke |
| " | 176a | On up stroke – operated by manual lever 32 |
| " | 176b | Off – operated by cylinder 112 at end of up stroke |
| " | 176c | On down stroke – operated by cylinder 40 at end of down stroke |
| " | 176d | Off – operated by cylinder 112 at end of down stroke |

INVENTOR
William A. Hart.
BY
Harness, Dickey & Pierce.
ATTORNEYS.

Patented June 20, 1939

2,162,813

UNITED STATES PATENT OFFICE 2,162,813

VERTICAL BROACH

William A. Hart, Detroit, Mich., assignor to Colonial Broach Company, a corporation of Michigan Application February 15, 1936, Serial No. 64,061

1 Claim. (Cl. 90—33)

The present invention relates to machine tools, and in particular provides an improved fully automatic broaching machine.

Objects of the present invention are to provide an improved broaching machine of the fully automatic type, in the operation of which stock to be broached may be placed over the free end of the broach and temporarily supported upon a supporting table, the broach then moved by return mechanism to the broach head at a starting position and engaged thereby, the broach then drawn through the stock, permitting it to be manually or automatically discharged from the machine, and the broach then returned to the starting position and released to the return mechanism, by which it is conveyed away from the broach head to a loading position, permitting new stock to be fitted thereover in readiness for the next broaching operation; to provide such a machine in which the return mechanism occupies the starting position during the broaching operation and does not return to the loading position until after receiving the broach from the broach head at the conclusion of the return stroke of the latter; to provide such a machine in which the return mechanism receives the broach directly from the broach head at the conclusion of the return stroke of the latter, thus eliminating the necessity for a free fall of the broach from the broach head to the return mechanism, and eliminating the necessity of guiding structure for guiding the broach between the time it is released by the broach head and the time it is received by the return mechanism.

Further objects of the present invention are to provide an improved broaching machine of the above described type, in which the entire broaching cycle is automatic, the starting of a complete broaching cycle being effected manually, and the remaining steps being effected automatically in response to the arrival of the broach head and of the return mechanism respectively at predetermined points in their travel.

With the above and other objects in view which appear in the following description and in the appended claim, a preferred but illustrative embodiment of the present invention is shown in the accompanying drawings, throughout which corresponding reference characters are used to designate corresponding parts, and in which:

Figure 1 is a perspective view in elevation of the machine as a whole;

Figure 2 is a view in central vertical section of the machine shown in Figure 1;

Figure 3 is a detail view in vertical section, taken along the line 3—3 of Figure 2;

Figure 6 is a schematic view of illustrative control mechanism for effecting the automatic operating sequence of the machine.

Figure 4:
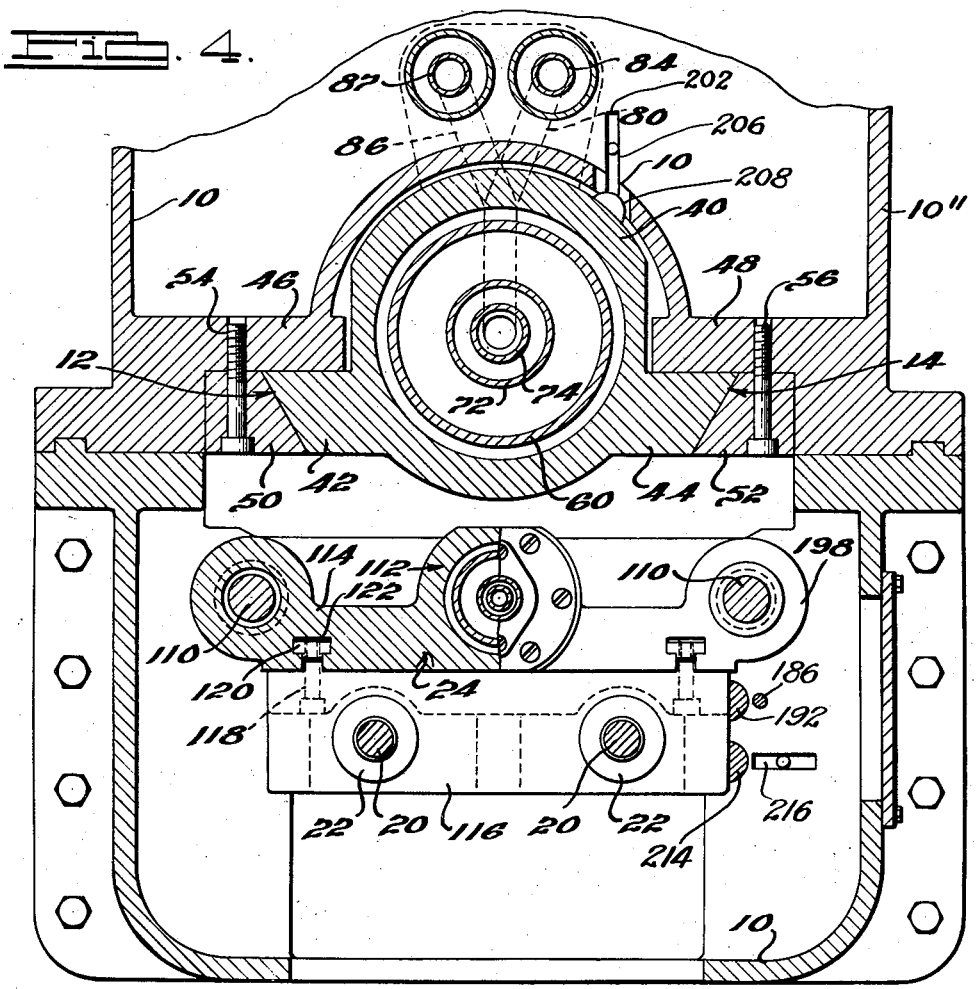
Figure 4 is a view in horizontal section, taken along the line 4—4 of Figure 2.
Figure 5:
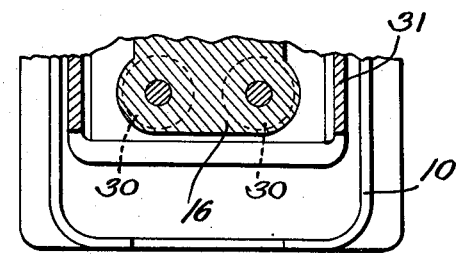
Fig. 5 is a fragmentary view in horizontal section, taken along the line 5—5 of Fig. 2.

Referring first to the general view, Figure 1, the machine, which is of the vertically disposed type, comprises generally a supporting and enclosing frame structure 10, constructed to define vertical ways 12 and 14, upon which a cross head 16 is guided for upward and downward movement, between the illustrated starting or lower position and a limit position above the starting position. The illustrated machine is of the multiple type, and accordingly, the cross head 16 is arranged to accommodate a plurality of broach draw head assemblies, each designated generally as 18 in Figure 1.

Broaches 20 are shown in Figure 1 as supported in a loading position within sockets such as 22, carried by a cross head 24 which is reciprocable vertically of the machine between the illustrated loading position and a higher starting position by the fluid pressure mechanism hereinafter described in more detail. In the loading position of the machine shown in Figure 1, it will be noted that the upper ends of the broaches 20 are disposed in spaced relation to and below the lower ends of the draw heads 18, thus permitting work pieces such as 26, to be fitted over the ends thereof. When thus fitted over the ends of the broaches 20, the work pieces 26 rest upon the stationary table designated generally as 28. The broaching operation is initiated, as later described, by raising the cross head mechanism 24, carrying with it broaches 20, to positions in which the upper ends of the broaches are received in and locked within broach heads 18. During the broaching operation, the stock is supported on the under side of the stationary work supports 30. At the conclusion of a broaching operation, the lower toothed portions of the broaches 20 pass above the lower edges of the supports 30, thus permitting the completed work pieces 26 to fall freely therefrom, at which time they are discharged from the machine in the manner hereinafter described. Supports 30 are carried upon a stationary U-shaped bracket 31 which extends forwardly from the frame 10, and between the two legs of which the head 16 is free to move.

Preferably, and as illustrated, the necessary control elements for the machine, which may include the starting handle 32 and the emergency stop lever 34, are supported upon the exterior of the machine, adjacent the front thereof, for convenient operation by the machine operator. Preferably, and as illustrated also, the machine is provided at the front with a raised platform 36, upon which the machine operator may stand and from which position he may conveniently feed work pieces to the broaches 20, and supervise the discharge of the completed work pieces from the machine.

Considering the above mentioned elements in more detail, and referring particularly to Figures 2, 3 and 4, the crosshead 16 which supports the previously mentioned broach heads 18 is either formed integrally with or is suitably secured to the outer casing 40 of a fluid pressure operated cylinder which is provided with laterally extending guide portions 42 and 44, which ride in the ways 12 and 14, defined by the frame portions 46 and 48 and by the guide bars 50 and 52, which are secured to the frame by the studs 54 and 56 respectively. The guide thus provided for cylinder 40 extends throughout its travel.

Cylinder 40 is preferably of the type described and claimed in the co-pending application of the present applicant, Serial No. 42,619, filed September 28, 1935, and assigned to the assignee of the present application. As described in more detail in that application, casing 40 is provided with an inner cylinder 60, which is secured in place axially of the casing 40 by the upper and lower enclosing cap plates 62 and 64. Cap plate 64 is provided with an axial passage to accommodate the piston rod 66. Piston rod 66 is stationarily supported on a boss 68, forming part of or suitably secured to the machine frame and positioned at the base thereof, and at its upper end is provided with a suitable piston 70. Piston rod 66 comprises two concentric tubes 72 and 74, the inner one of which communicates with an opening 76 formed in piston 70, and thus communicates with the chamber portion above piston 70. The outer tube 72 is provided with lateral ports 78 through which the interior thereof communicates with the chamber space beneath piston 70. The inner tube 74 communicates through a passage 80 formed in a head 82, with a suitable supply line 84, which may be selectively connected as hereinafter described, to a suitable source of fluid pressure or to an exhaust line. The outer tube 72 communicates through a corresponding passage 86 formed in head 82 with a corresponding line 87 which may also be selectively connected to a source of fluid pressure or to an exhaust line.

Each broach head 18 is of the automatic locking and unlocking type, and includes a shank 90, provided with an axial passage 92, dimensioned to freely receive the upper end of the associated broach 20. Shank 90 also includes a plurality of lateral passages 94, each of which receives a locking pin 96, which is movable radially therein between the retracted or released position shown in Figure 2, and an inner or locking position in which the inner face of each locking pin is received in the conventional notch 98 formed near the upper end of the associated broach 20. The movement of the locking pins 96 to the locking position, and the positive retention thereof in such position, is controlled by an outer sleeve 100, slidable upon the shank 90, and biased to a locking position by a compression spring 102 which is seated between the lower surface of the crosshead 16 and the upper surface of the sleeve 100. In Figure 2, sleeve 100 is shown in upper or released position, in which the locking pins 96 are received in corresponding recesses 107 formed in the sleeve 100, which recesses are deep enough to permit locking pins 96 to move to positions in which they are ineffective to engage the associated broach. Each sleeve 100 may be forced to the illustrated released position, at the conclusion of each downward or return stroke of crosshead 16 by the engagement between a shoulder 106 formed on each sleeve 100 and the upper surface of the frame boss 31 which supports the work supports 30. Downward movement of each sleeve 100 is limited by engagement of the shoulders 104 thereof with the lower end of shank 90.

Each of the work supporting members 30 includes a central passage 108 to accommodate the associated broach 20, and the under side of each member 30 is accurately horizontally disposed, to provide a correspondingly accurate support for the associated work piece 26, during the broaching operation.

The crosshead 24, which supports the broach receiving sockets 22 in accurate vertical alignment with the broach head 18, is guided upon vertical guide rods 110, suitably supported within the machine frame, and the raising and lowering movements thereof are effected by the fluid pressure operated cylinder mechanism designated generally as 112. For convenience of vertical adjustment, to accommodate broaches 20 of different dimensions, the crosshead 24 is formed in two parts, including a rear portion 114 and a forward portion 116, which parts are connected together by countersunk studs 118, the nuts 120 of which lie in conventional T slots 122 formed in the portion 114. With this arrangement, as will be understood, by backing off the studs 118, the forward portion, carrying the sockets 22, may be raised or lowered with reference to the rear portion 114.

The fluid pressure cylinder 112 is preferably constructed as described with reference to the cylinder 40, and includes the outer casing 130, the inner casing 132 and the piston 134, which is formed at the lower end of the piston rod 136. Rod 136 is stationarily supported at its upper end in a boss 138 which extends rearwardly from the work table 28. As most clearly shown in the fragmentary view, Figure 3, the inner tubular member 140 of piston rod 136 communicates with the chamber space beneath piston 134, and also communicates through passage 142 with a suitable line 144. The outer tubular piston rod member 146 communicates through the side ports 148 with the chamber space above piston 134, and, through the lateral passage 150, communicates with a suitable supply line 152. As described in more detail hereinafter, the lines 144 and 152 are selectively connectible to supply and exhaust lines to correspondingly effect the upward and downward movements of crosshead 24 and consequently of sockets 22.

The work table 28, either formed integrally with or suitably secured to the frame portion 10 at the front of the machine, includes the horizontal portion 160, upon which the work pieces 26 rest prior to the beginning of a broaching operation and the slanting forward portions 162, along which the work pieces slide and from which they are discharged into a lateral chute 164 also shown in Figure 1. The base of chute 164 is formed as a grill 166, through which any cutting compound may pass. The grill 166 also passes the chips which accumulate during the broaching operation. Table 26 is also provided with openings 163 through which broaches 20 pass.

The automatic operating sequence hereinafter described may be effected in various ways, within the scope of the present invention. In certain instances, it is considered desirable to utilize an automatic control system embodying valves of the fluid pressure operated type, and to control the fluid operated valves through suitable auxiliary fluid control lines, the valves themselves being adapted to control the main fluid pressure connections for cylinder 40 and cylinder 112. Alternatively, the automatic control operations may be effected mechanically. For simplicity, a mechanically operated control system is shown in the present application, to illustrate one effective arrangement for providing the hereinafter described automatic operating cycle.

Referring particularly to Figure 6, cylinders 40 and 112 are provided with main valves 170 and 172, respectively. Valve 170 communicates with cylinder 40 through the previously mentioned lines 84 and 87, and valve 172 communicates with cylinder 112 through the previously mentioned lines 144 and 152. Valves 170 and 172 are each preferably of the type which may be moved to successive operating positions thereof by uni-directional rotation of a suitable control shaft individual thereto. The control shaft for valve 170 is designated 174 and the control shaft for valve 172 is designated 176. It will be understood that uni-directional rotation of shaft 174 in the counter-clockwise direction notches valve 170 to its successive operating positions and that corresponding counterclockwise rotation of shaft 176 notches valve 172 to its successive operating positions.

In the illustrated arrangement, valve 170 provides three different operating positions including an off position, in which flow through the valve, and consequently through cylinder 40, is prevented; an on-upstroke position in which line 84 is connected through the line 178 to a suitable pump P or other source of fluid pressure and line 87 is connected to an exhaust line 180, which may lead to a suitable sump; and a reverse position in which line 84 is connected to the exhaust line 180 and line 87 is connected to the supply line 178. Valve 172 is arranged to provide an off position in which flow through the valve and consequently through cylinder 112 is prevented; an on-upstroke position, in which line 152 is connected to the supply pump and line 144 is connected to the associated exhaust line, resulting in upward movement of cylinder 112; a second off position in which flow through the valve is prevented and in which position cylinder 112 is retained in its upper limit position; and an on-downstroke position in which line 144 is connected to the pump and line 152 is connected to the exhaust line, resulting in downward or return movement of cylinder 112.

The successive notching movements of valve 170 between the three above described positions are effected by a series of cranks 174a, 174b, and 174c, associated therewith, each of which is connected thereto through a conventional ratchet connection, and each of which is biased to the normal or unoperated position by a spring associated with the hereinafter described actuating means therefor. Through the ratchet connection each crank is effective, during counter-clockwise rotation, to cause counter-clockwise rotation of shaft 174 through an angle sufficient to move valve 170 from one position thereof to the next position thereof. The times and manner of operation of the cranks are stated in the legends appearing in Figure 6, crank 174a being operated by cylinder 112 at the end of the upstroke thereof, to move valve 170 from the off position to the on-upstroke position. Crank 174b is arranged to be operated by cylinder 40 at the end of the upstroke thereof, and throws valve 170 to the reverse position, resulting in a downward or return movement of cylinder 40. Crank 174c is arranged to be operated by cylinder 40 at the end of the down stroke thereof, and throws valve 170 to its initial off position. The operation of crank 174a is effected through push rods 182, 184 and 186 and bell cranks 188 and 190. Push rod 186 is actuated by a cam 192 carried by the cylinder 112 when the latter reaches its upper limit position. Crank 174b is actuated through push rods 192 and 194 and bell crank 196, push rod 194 being engaged by a cam 198 carried on cylinder 40 when the latter reaches its upper limit. Crank 174c is actuated through push rods 200 and 202, and bell cranks 204 and 206, the latter bell crank being rocked by a cam 208 on cylinder 40 when the latter reaches its lower limit.

Shaft 176 is adapted to be similarly operated by a series of cranks 176a, 176b, 176c, 176d, each of which is connected to shaft 176 through a ratchet and biased to the normal or unoperated position by a spring as in the case of cranks 174a etc. Crank 176a is adapted to be operated by the previously mentioned manually controlled starting lever 32, positioned at the right hand side of the machine, and serves to throw the valve 172 from its initial off position to its on-upstroke position, in which it is effective to cause upward movement of cylinder 112. Crank 176b is adapted to be operated by cylinder 112 at the end of its upstroke, (through push rod 210 and the previously mentioned push rods 184 and 186) and results in moving valve 172 to its second off position. Crank 176c is operated by cylinder 40 at the end of the down stroke thereof, (through push rod 212 and the previously mentioned push rod 202) and serves to throw valve 172 to the on-down-stroke position, resulting in a downward movement of cylinder 112. The remaining crank 176d is arranged to be operated by cylinder 112 at the end of the downstroke thereof, throwing valve 172 to its initial off position. For this purpose cylinder 112 is provided with a cam 214 which rocks a bell crank 216, and is connected to crank 176d through push rods 218 and 220 and bell crank 222.

Considering now the operation of the machine as a whole, the parts are shown in the various figures in what may be called a loading position of the machine, that is, a position in which the crosshead 16 is at the lower limit of its stroke ready to begin an upward or working stroke, and the return mechanism, comprising the sockets 22 and crosshead 24, is at the lower end of its stroke, in which position it supports the broaches 20 with the upper ends thereof in spaced relation to the broach heads 18, thus permitting work pieces 26 to be slipped thereover to the positions shown, in which positions they are supported upon the horizontal portions of the table 28.

To begin a working stroke of the machine, the manually operated starting handle 32 (Fig. 1 and 6) may be operated to actuate valve 172 to the on-upstroke position as previously described. This action connects cylinder mechanism 112 to the source of fluid pressure in a direction to cause upward movement of crosshead 24 and broaches 20. As cylinder 112 approaches the upper limit of its stroke, it operates the crank 176b, moving valve 172 to the off position, and bringing cylinder 112 to rest, in which position it is retained by the fluid trapped within the cylinder 112 until the next operation of valve 172.

The stopping of cylinder 112 is timed to occur after the upper end of each broach 20 has entered the central opening 92 formed in the shank of the associated broach head, and slightly before such upper end engages the base of such opening. During this entering movement of each broach 20, the locking pins 96 associated with the locking head 18 individual thereto occupy the retracted positions to which they were moved at the conclusion of the previous broaching operation, and thus do not interfere with such movement.

The arrival of cylinder mechanism 112 at its upward limit also actuates crank 174a associated with valve 170, moving this valve to the on-upstroke position, and resulting in initiating an upward or working stroke of cylinder 40. The upward movement of cylinder 40 causes corresponding upward movement of both broach heads 18. In the initial stages of the upward movement of broach heads 18, the compression springs 102 individual thereto act to maintain the sleeves 106 stationary. The consequent relative movement between each broach head shank 90 and the associated sleeve 106, cams the locking pins 96 individual thereto inwardly, into locking position within the notch 98 formed in the associated broach 20. It will be understood that the notch 98 in each broach 20 is long enough to allow for this relative movement.

Upon movement of the locking pins 96 to the locking position as just described, the continued upward movement of cylinder 40 effects a corresponding upward movement of the broaches 20, during the initial stages of which the work pieces 26 are carried upwardly with the broaches, until such time as they engage the under sides of the work supports 30. At such time, the upward movements of the work pieces 26 are interrupted and the further movement of broaches 20 results in the broaching of the work pieces. At the conclusion of broaching operation, the work pieces 26 fall freely away from the ends of broaches 20, and are deflected along the sloping table 28 into the previously mentioned chute 164.

When cylinder 40 reaches the upper limit of its stroke, it operates crank 174b to throw valve 170 to the reverse position in which it connects cylinder 40 for downward operation. At the conclusion of its return or downward stroke, cylinder 40 operates cam 174c, which, as previously described, throws valve 170 to the initial off position, stopping it and maintaining it at rest at its starting position.

Just prior to the arrival of cylinder 40 at its stopping position, the under surface of each broach head sleeve 106 engages the upper supporting surface of the boss or bracket 31 and is accordingly stopped thereby. The final downward movements of cylinder 40 thus results in effecting relative movement between each sleeve and each shank 90, against the force of the compression springs 102 associated therewith, and permitting retracting movements of the locking pins 96. The retracting movements are effected by the weight of the associated broach.

The release of each broach 20, as just described, occurs at or about the time the lower end thereof reaches the base of its associated socket 22. Upon being released, from heads 18 accordingly, broaches 20 are directly received by and supported by sockets 22.

The arrival of cylinder 40 at its starting position also actuates crank 176c to move valve 172 to the on-downstroke position, resulting in a downward or return stroke of cylinder mechanism 112, carrying with it the crosshead 24, sockets 22 and broaches 20.

When cylinder 112 reaches its lower limit of travel, it actuates crank 176d to thereby move valve 172 to the off position, stopping cylinder 112 in its lower limit position. At the conclusion of this operation, all of the operating mechanisms are in their initial positions, and in readiness for a duplicate operating cycle, which may be initiated in the manner previously described. As will be understood, during the period that broaches 20 are in spaced relation from the associated broach heads, new work pieces 26 may be fitted thereover, in readiness for the next operation.

From the foregoing, it will be seen that the present invention provides a fully automatic broaching machine, the operating cycle of which is relatively simple and direct. As will be evident, various modifications in the form, number and arrangement of parts may be made within the spirit and scope of the present invention, and it is to be understood, therefore, that the described embodiment is to be considered in an illustrative and not in a limiting sense.

I claim as my invention:

A broaching machine comprising, in combination, a broach head operable to draw a broach in one direction from a starting position through a working stroke and to return it to said starting position; broach receiving mechanism effective to receive said broach at said starting position and move it in a direction opposite to said working stroke to a retracted loading position and to return the broach to the starting position; power means for effecting said movements of said broach receiving mechanism and of said broach head; a control member engageable and movable by said broach receiving mechanism upon the arrival of said broach receiving mechanism at said starting position for actuating said power means to cause said broach to start from said starting position and draw said broach through said working stroke; and a control member engageable and movable by said broach head upon the arrival of said broach head at said starting position for actuating said power means to cause said broach receiving mechanism to move said broach to said retracted position.

WILLIAM A. HART.